(12) United States Patent
Schach et al.

(10) Patent No.: US 6,982,868 B2
(45) Date of Patent: Jan. 3, 2006

(54) DISPLAY DEVICE FOR A MOTOR VEHICLE

(75) Inventors: Harald Schach, Flacht (DE); Walter Koch, Weissach (DE); Bernhard Herzog, Stuttgart (DE); Gunter Veigel, Leonberg (DE); Volker Burkhardt, Ostelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 10/789,724

(22) Filed: Feb. 27, 2004

(65) Prior Publication Data

US 2004/0233622 A1 Nov. 25, 2004

(30) Foreign Application Priority Data

Feb. 27, 2003 (DE) ................................ 103 08 390

(51) Int. Cl.
*G06F 1/16* (2006.01)
(52) U.S. Cl. ........................ 361/681; 248/27.3; 307/9.1
(58) Field of Classification Search ................. 361/681
See application file for complete search history.

(56) References Cited

U.S. PATENT DOCUMENTS

| 5,847,685 | A | * | 12/1998 | Otsuki .......................... 361/681 |
| 6,011,685 | A | * | 1/2000 | Otsuki .......................... 361/681 |
| 6,711,003 | B2 | * | 3/2004 | Nakasuna .................... 361/681 |
| 6,754,070 | B2 | * | 6/2004 | Chen ............................ 307/9.1 |
| 2002/0101117 | A1 | * | 8/2002 | Shibuya ....................... 307/9.1 |

FOREIGN PATENT DOCUMENTS

EP  1 016 950  7/2000

* cited by examiner

*Primary Examiner*—Lisa Lea-Edmonds
(74) *Attorney, Agent, or Firm*—Kenyon & Kenyon

(57) ABSTRACT

A display device for a motor vehicle. In order to allow a compact, space-saving and cost-effective design and a rotation of the display with little change in position, the display device includes a display housing for mounting on a vehicle dashboard; and a display frame for accommodating a display. The display is rotatable with respect to the display housing. The display device further includes a driven element affixed on the display housing; and a drive device affixed on the display frame, having an electric motor, a worm gear and a gear-output shaft for engaging with the driven element. The electric motor arranged in a center region of the display frame and the engagement of the gear-output shaft with the driven element occurs outside the axis of rotation.

15 Claims, 5 Drawing Sheets

DISPLAY DEVICE FOR A MOTOR VEHICLE

FIELD OF THE INVENTION

The present invention relates to a display device for a vehicle, in particular a motor vehicle.

BACKGROUND INFORMATION

In order to allow an optimal adjustment of the display to the particular seating position of the user, adjustable display devices are known. European Patent No. EP 1 016 950, describes a display housing which has a lower fixed housing component and an upper housing component that is arranged thereon in a rotatable manner. Affixed on the upper housing component is a motor having a worm-gear step via which a drive pinion is driven that rolls along a concave tooth segment of the lower housing component. The two housing components are situated on top of one another in arc-shaped regions and can slide. By the adjustment via the electric motor and the worm gear, the upper housing component can be adjusted relative to the lower housing component, in a self-locking manner, a swivel motion occurring about a horizontal axis of rotation that lies above the display housing.

As a result, both the incline of the upper housing component accommodating the display and also its position are reset during the adjustment. The concave tooth-segment guidance and the swivel space require considerable space, which is a disadvantage in view of the tight space in the dashboard region.

SUMMARY

An example display device of the present invention may have the particular advantage that it provides a compact and space-saving design and allows the display to be rotated by only a slight change in position, or preferably no change at all. Due to an advantageous lever effect, the display frame may be rotated quickly and at low power, so that a small, fast-spinning electric motor having a low power output may be used. Furthermore, a simple, fast, self-adjusting and reliable mounting of the display device according to the present invention is achieved.

According to an example embodiment of the present invention, the electric motor is situated in a center region of the display frame. In particular, this may be in an exact center position of the display frame, i.e., precisely in the vertical axis of rotation of the display frame, so that the electric motor, due to its low moment of inertia with respect to the rotating motion, affects the swiveling motion of the display frame only to a negligible degree. However, it is also possible for the electric motor to be positioned slightly outside the axis of rotation. In an advantageous manner, the display or the display field may extend across a large part, or the entire cross-sectional area, of the display device and thereby ensure an optimal utilization of the available space or area in the dashboard region since the drive unit, made up of motor and multi-step worm gear and the driven component engaging therewith, which is affixed on the display housing, may be accommodated behind the display. According to an example embodiment of the present invention, the worm gear has at least two, or precisely two, worm-gear steps. This makes it possible for the drive pinion to act on the driven component, affixed on the housing and advantageously designed as a convex tooth segment, at a high lateral offset with respect to the electric motor and the axis of rotation, and thus with a great lever effect. As a result, a fast-spinning electric motor, which has a small design and low power output, may be used and rapid tilting be ensured.

Due to the fact that preferably the driven component may be adjusted between an engaging position and a released position without rotating the display frame, a quick and simple installation is possible. To this end, the driven component may abut against the drive pinion of the drive unit on the side of the frame, preferably with an initial spring tension, and be longitudinally displaced, for instance by means of a slot-peg guidance. The initial spring tension also eliminates the tooth play.

BRIEF DESCRIPTION OF THE DRAWINGS

The present invention is explained in greater detail in the following on the basis of the accompanying drawing and an example embodiment.

DETAILED DESCRIPTION OF EXAMPLE EMBODIMENTS

Figure 1:
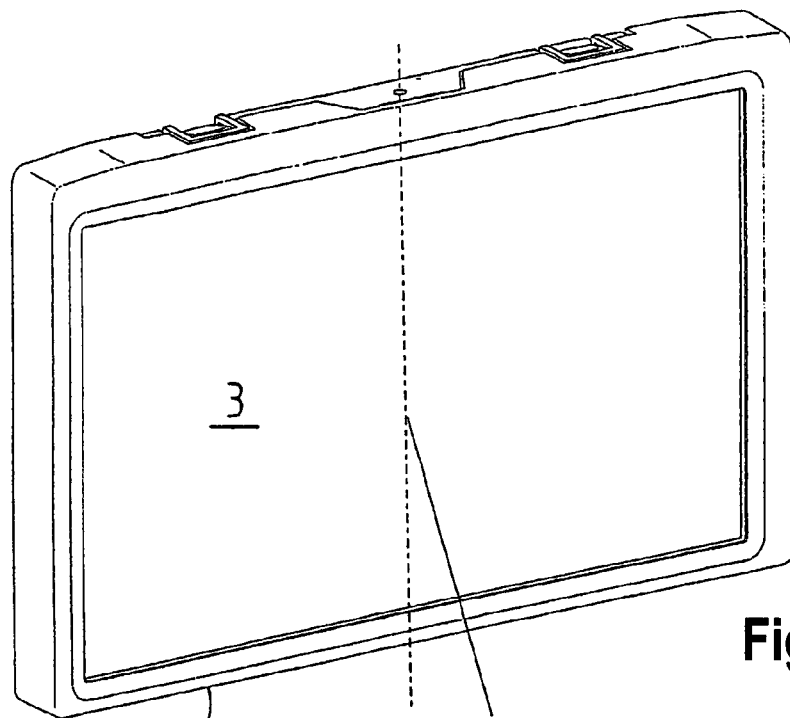
FIG. 1 shows a perspective frontal view of the display frame with display.
Figure 2:
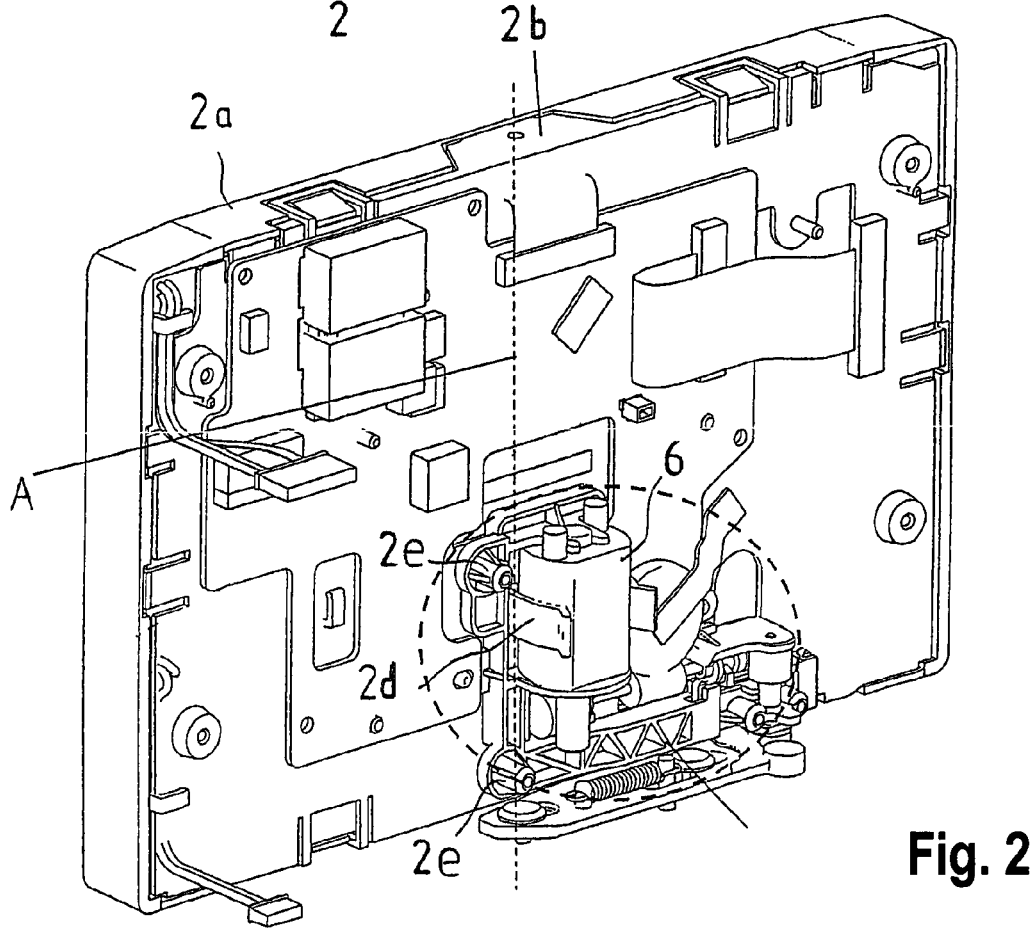
FIG. 2 shows a rear view of the display frame.

A display device 1 includes a display frame 2, which accommodates a display 3 and is supported in a display housing 4 so as to be rotatable about a vertical center axis A. Display housing 4 may be mounted on the dashboard of a motor vehicle, for instance. Display frame 2 has a molding 2a surrounding display 3 and a back plate 2b clipped to molding 2a, an electric motor 6 and a two-step worm gear 7 being affixed to rear plate 2b as part of an adjustment device 5. Electric motor 6 and the components of worm gear 7 are mounted by means of holding clamps 2d, for example, which are affixed to back plate 2b via screw connections 2e.

Figure 4:
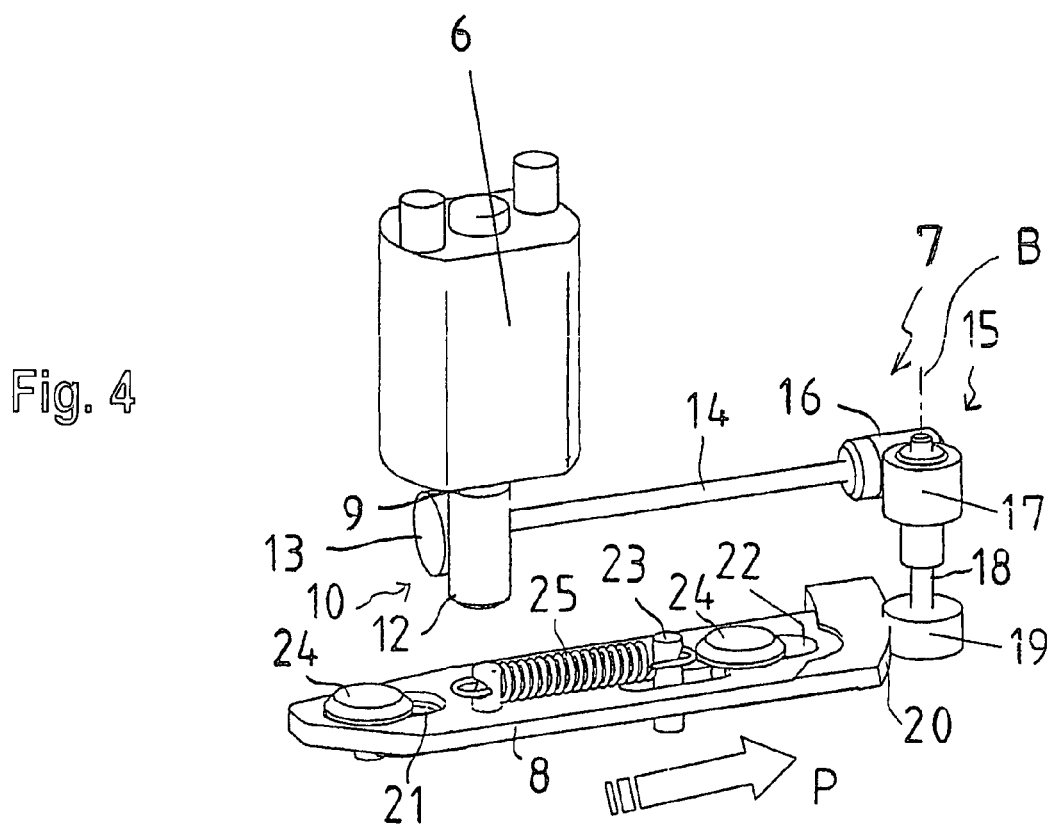
FIG. 4 shows the adjustment device made up of motor, worm gear and tooth segment on the housing side.

Worm gear 7 cooperates with a tooth segment 8 mounted on fixed display housing 4 so as to be laterally displaceable, the tooth segment being used as thrust bearing and the components together constituting adjustment device 5. The design and operation of adjustment mechanism 5 is shown in greater detail in FIG. 4. A motor output shaft 9 of electric motor 6 serves as input shaft of a first worm-gear step 10, which has a first worm 12 affixed on motor output shaft 9, and a first gear wheel 13 driven by first worm 12. First gear wheel 13, via a horizontally extending intermediate shaft 14, has a second worm-gear step 15 with a second worm 16 and a second gear wheel 17 driven thereby, which drives a drive pinion 19 via a third, vertically extending gear-output shaft 18, the drive pinion engaging with an arc-shaped toothing region 20 of tooth segment 8. Tooth segment 8 has longitudinal holes 21, 22 through which pegs 24 project, which are attached to display housing 4.

This provides a slot-peg guidance for a linear displacement of tooth segment 8, so that toothing region 20 may engage with pinion 19 by the prestress of a spring 25. Spring 25 is designed as helical spring and attached by one end to tooth segment 8 and by the other end to a pin 23 projecting through longitudinal hole 22. The initial stress of spring 25 pulls tooth segment 8 against drive pinion 19, in arrow direction P. A release of tooth segment 8 is achieved accordingly, by pulling away against the pull of spring 25. An axis of rotation B of drive pinion 19 is set apart from the swivel axis of display frame 2 formed by center axis A, by the horizontal, i.e., lateral, extension of intermediate shaft 14, which thus forms the lever arm for the swivel drive.

Figure 5:
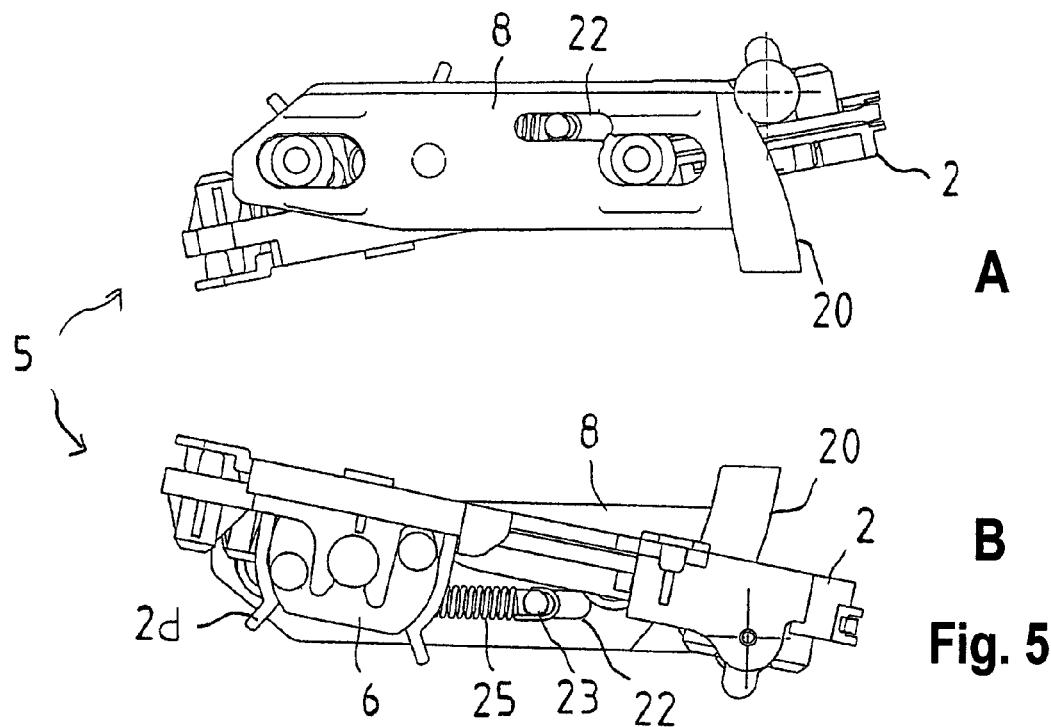
FIGS. 5a, 5b show a plan view and view from below of the display device in a positive final position.
Figure 6:
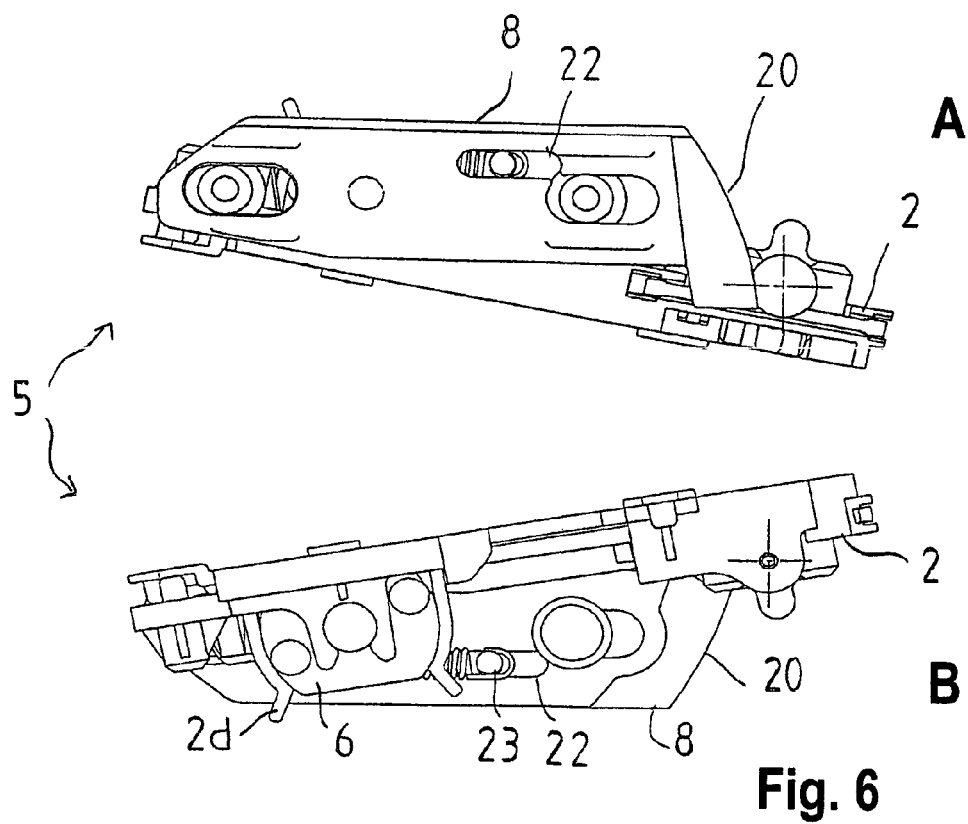
FIGS. 6a, 6b show corresponding views in a negative final position.
Figure 7:
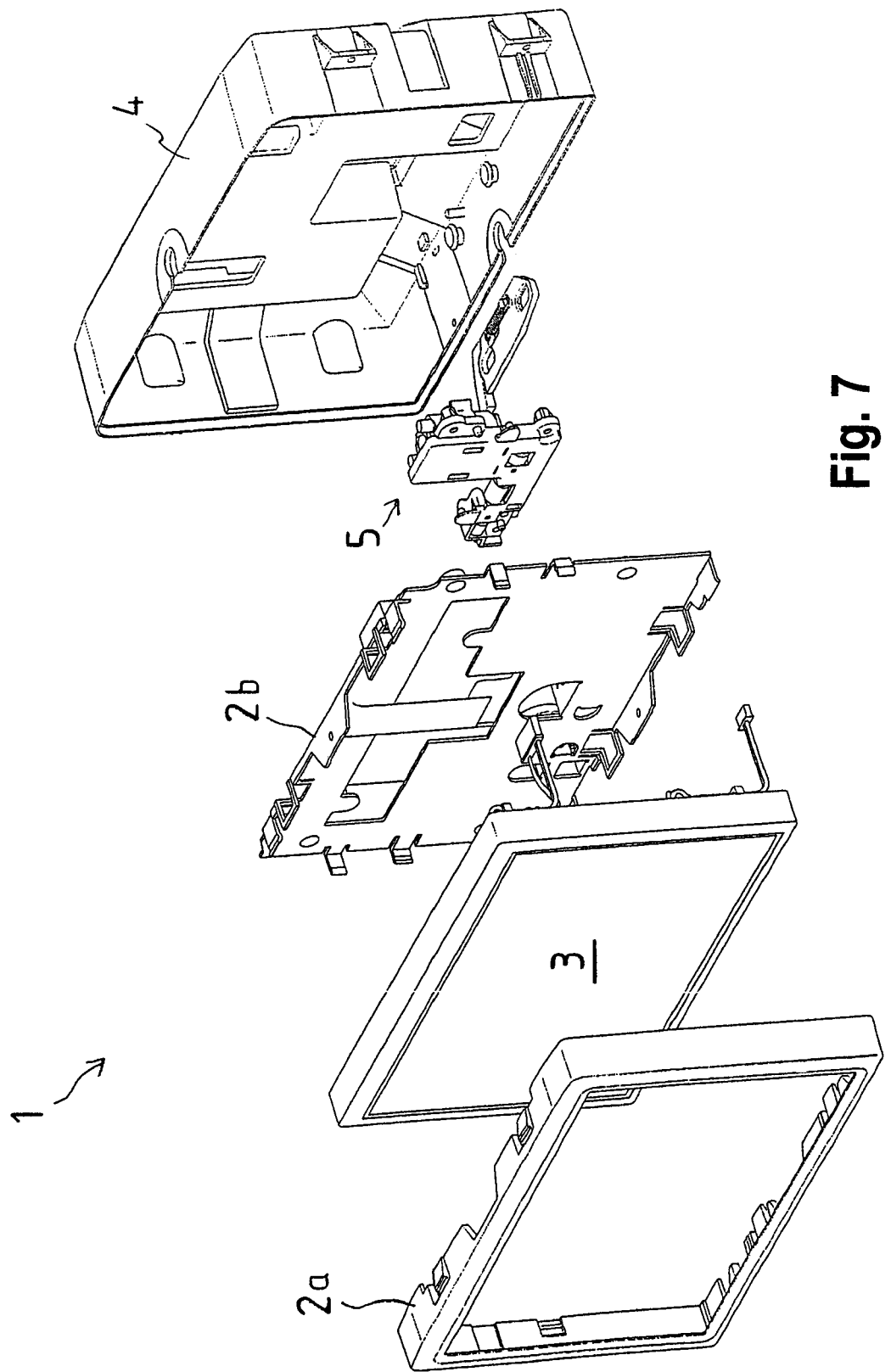
FIG. 7 shows an exploded view of the display device.
Figure 8:
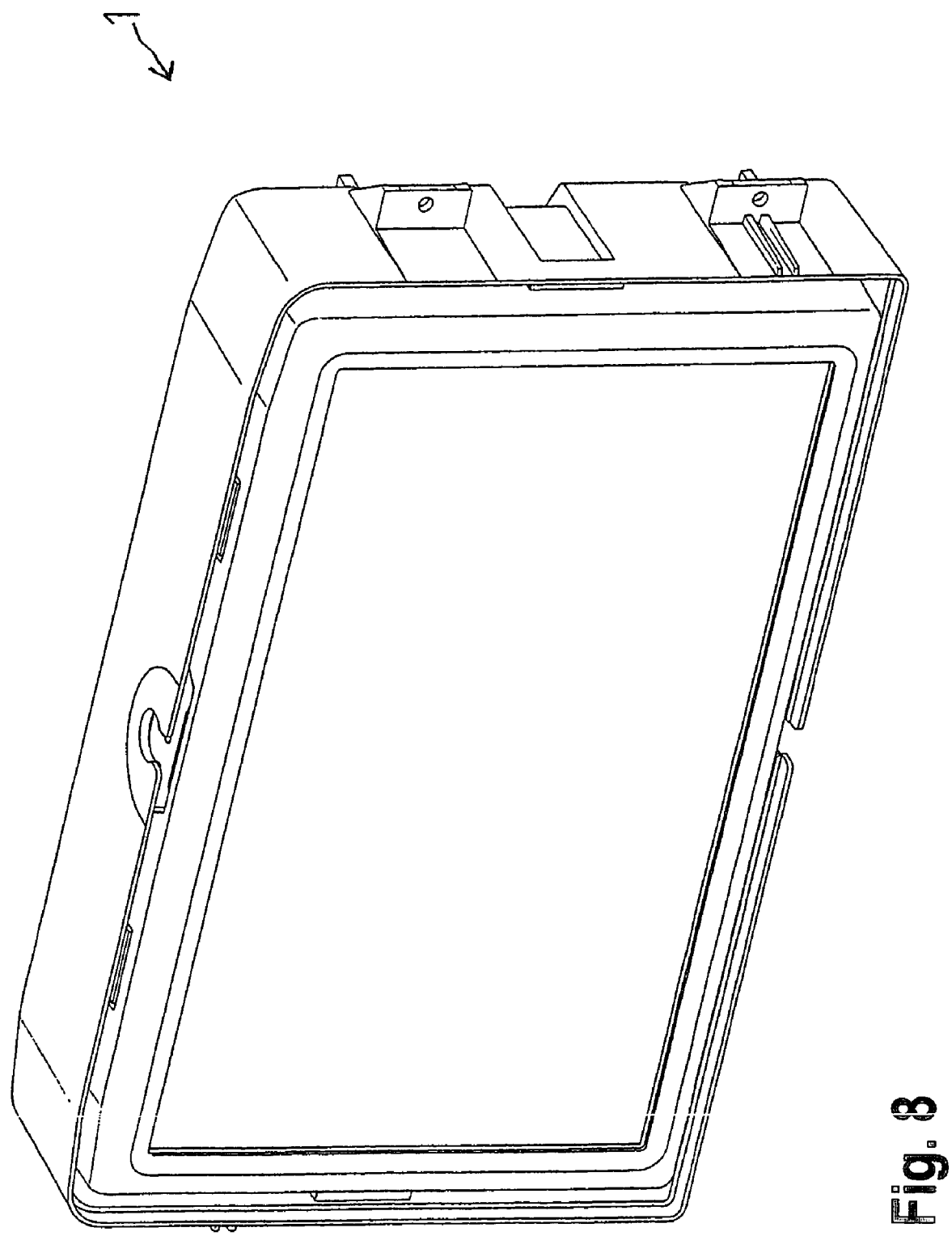
FIG. 8 shows a perspective view of the assembled display device.

Axis of rotation A extends through display 3 and may run both centrically, as shown in FIG. 1, and also slightly eccentrically. The final positions of display frame 2 having display 3 are shown in FIGS. 5 and 6.

During installation, electric motor 6 is inserted in mounting clamp 2d. Display frame 2 is placed inside display housing 4 together with display 3. In the process, tooth segment 8 engages with drive pinion 19 via an initial spring tension, so that a simple, rapid as well as self-adjusting and reliable installation is achieved.

Figure 3:
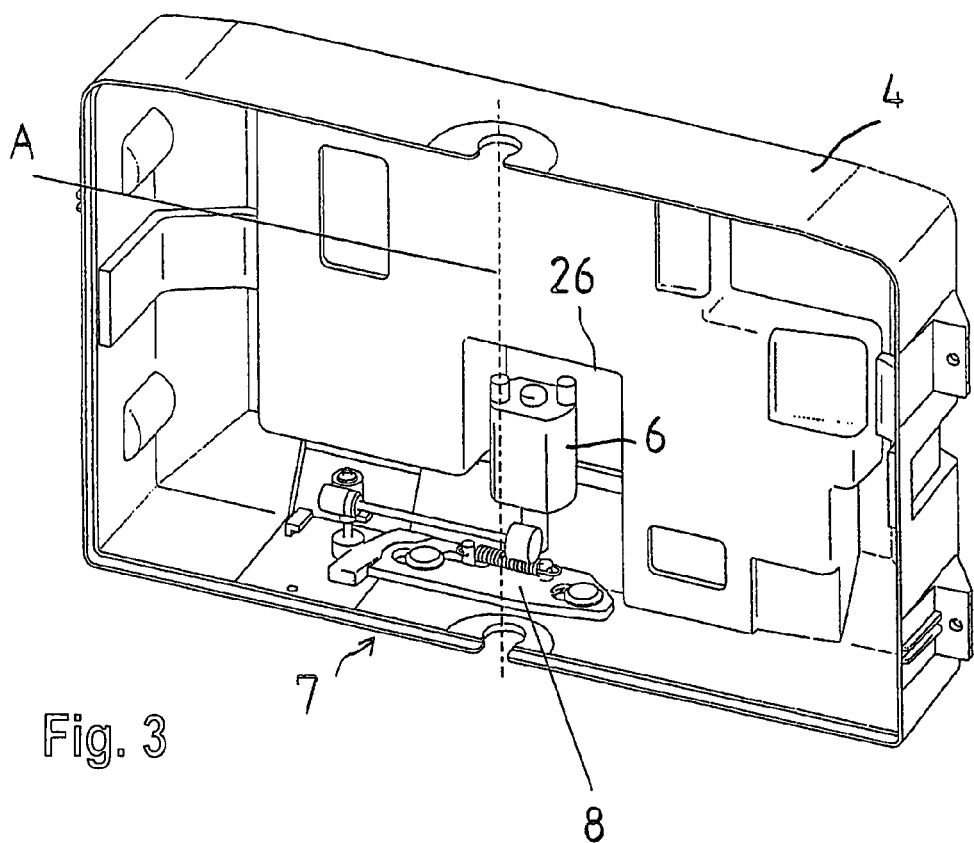
FIG. 3 shows the arrangement of the motor and worm gear in the display housing.

As can be seen in FIG. 3, electric motor 6 is inserted into a recess 26 of display housing 4. Recess 26 is formed in a center region of display housing 4, behind axis of rotation A, or in the region of the axis of rotation, so that electric motor 6 remains in recess 26 across the entire pivoting angle of display frame 2.

What is claimed is:

1. A display device for a motor vehicle, comprising:
   a display housing for mounting on a vehicle dashboard;
   a display frame to accommodate a display, the display frame being rotatable about an axis of rotation with respect to the display housing;
   a driven element affixed on the display housing; and
   a drive device, affixed on the display frame, having an electric motor, a worm gear and a gear-output shaft for engaging with the driven element, the electric motor being arranged in a center region of the display frame, and the engagement of the gear-output shaft with the driven element being provided outside the axis of rotation.

2. The display device as recited in claim 1, wherein the worm gear has at least two steps, at least one of which is a worm-gear step.

3. The display device as recited in claim 1, wherein the worm gear has at least one first worm-gear step and a second worm-gear step downstream from the first worm-gear step.

4. The display device as recited in claim 3, wherein the second worm-gear step is connected to the first worm-gear step via an intermediate shaft extending perpendicularly to the axis of rotation.

5. The display device as recited in claim 1, wherein the axis of rotation extends through the display frame.

6. The display device as recited in claim 5, wherein the axis of rotation extends through the display.

7. The display device as recited in claim 1, wherein the axis of rotation is offset with respect to a center line of the display.

8. The display device as recited in claim 1, wherein the electric motor is arranged essentially in the axis of rotation of the display frame.

9. The display device as recited in claim 1, wherein a gear-output shaft extends in parallel to the axis of rotation, extending at an offset thereto in a lateral direction.

10. The display device as recited in claim 1, wherein the driven element is a tooth segment affixed on the display housing so as to be adjustable, the tooth segment being adjustable between an engagement position for engaging with a drive pinion of the worm gear and a released position that is not engaged.

11. The display device as recited in claim 10, wherein the tooth segment has a convex toothing region.

12. The display device as recited in claim 10, wherein the tooth segment is prestressed to the engagement position.

13. The display device as recited in claim 12, wherein the tooth segment is adjustable in a longitudinal direction on the display frame.

14. The display device as recited in claim 13, wherein the tooth segment is adjustable via at least one slot-peg guidance.

15. A method for producing a display device, comprising:
   providing a display housing for mounting on a vehicle dashboard;
   providing a display frame to accommodate a display, the display frame being rotatable about an axis of rotation with respect to the display housing;
   providing a driven element affixed on the display housing;
   providing a drive device, affixed on the display frame, having an electric motor, a worm gear and a gear-output shaft for engaging with the driven element, the electric motor being arranged in a center region of the display frame, and the engagement of the gear-output shaft with the driven element being provided outside the axis of rotation; and
   inserting the display into the display housing, the tooth segment engaging with the drive pinion with an initial tension.

* * * * *